United States Patent [19]
Handa

[11] Patent Number: 5,890,820
[45] Date of Patent: Apr. 6, 1999

[54] PRINTERS

[75] Inventor: Yuji Handa, Akishima, Japan

[73] Assignee: Casio Computer Co., Ltd., Tokyo, Japan

[21] Appl. No.: 714,203

[22] Filed: Sep. 16, 1996

[30] Foreign Application Priority Data

Sep. 21, 1995 [JP] Japan ................................. 7-266148

[51] Int. Cl.[6] .............................. B41J 11/48; B41J 2/315
[52] U.S. Cl. ................................ 400/615.2; 400/120.02; 400/76; 347/172
[58] Field of Search ............................... 400/615.2, 586, 400/120.02, 61, 62, 76; 347/172

[56] References Cited

U.S. PATENT DOCUMENTS

| 4,586,834 | 5/1986 | Hachisuga et al. | 400/120.13 |
| 5,429,443 | 7/1995 | Kobayashi et al. | |
| 5,466,075 | 11/1995 | Kouzai et al. | 400/120.2 |
| 5,480,246 | 1/1996 | Morimoto | 400/615.2 |
| 5,538,352 | 7/1996 | Sugiura | 400/615.2 |

FOREIGN PATENT DOCUMENTS

| 0600593 A2 | 6/1994 | European Pat. Off. |
| 0641663 A2 | 3/1995 | European Pat. Off. |
| 0661649 A2 | 7/1995 | European Pat. Off. |

OTHER PUBLICATIONS

Patent Abstracts of Japan, vol. 013, No. 122 (M–807) Mar. 27, 1989 & JP 63 295289 A (Mitsubishi Electric Corp), Dec. 1, 1988.
Patent Abstracts of Japan, vol. 009, No. 098 (M–375), Apr. 27, 1995 & JP 59 222380 A (Fujitsu KK) Dec. 14, 1994.

*Primary Examiner*—John S. Hilten
*Attorney, Agent, or Firm*—Frishauf, Holtz, Goodman, Langer & Chick

[57] ABSTRACT

A printer comprising a key-in unit, a cartridge detecting unit, a data storage, a ROM, a font memory, a display control unit, a display, a print control unit, a printing unit, and a controller. When a cartridge which contains a printing medium is placed in the printing unit, the color of the printing medium is then determined through the cartridge detecting unit. The user inputs character data, etc., without specifying any print colors from the key-in unit. The input character data is then stored in the data storage. When such input character data is printed, the controller automatically sets the color of a character printing pattern at a color predetermined in correspondence to the color of the printing medium determined through the cartridge detecting unit. The printing unit prints the character data, etc., in the color set by the controller.

2 Claims, 19 Drawing Sheets

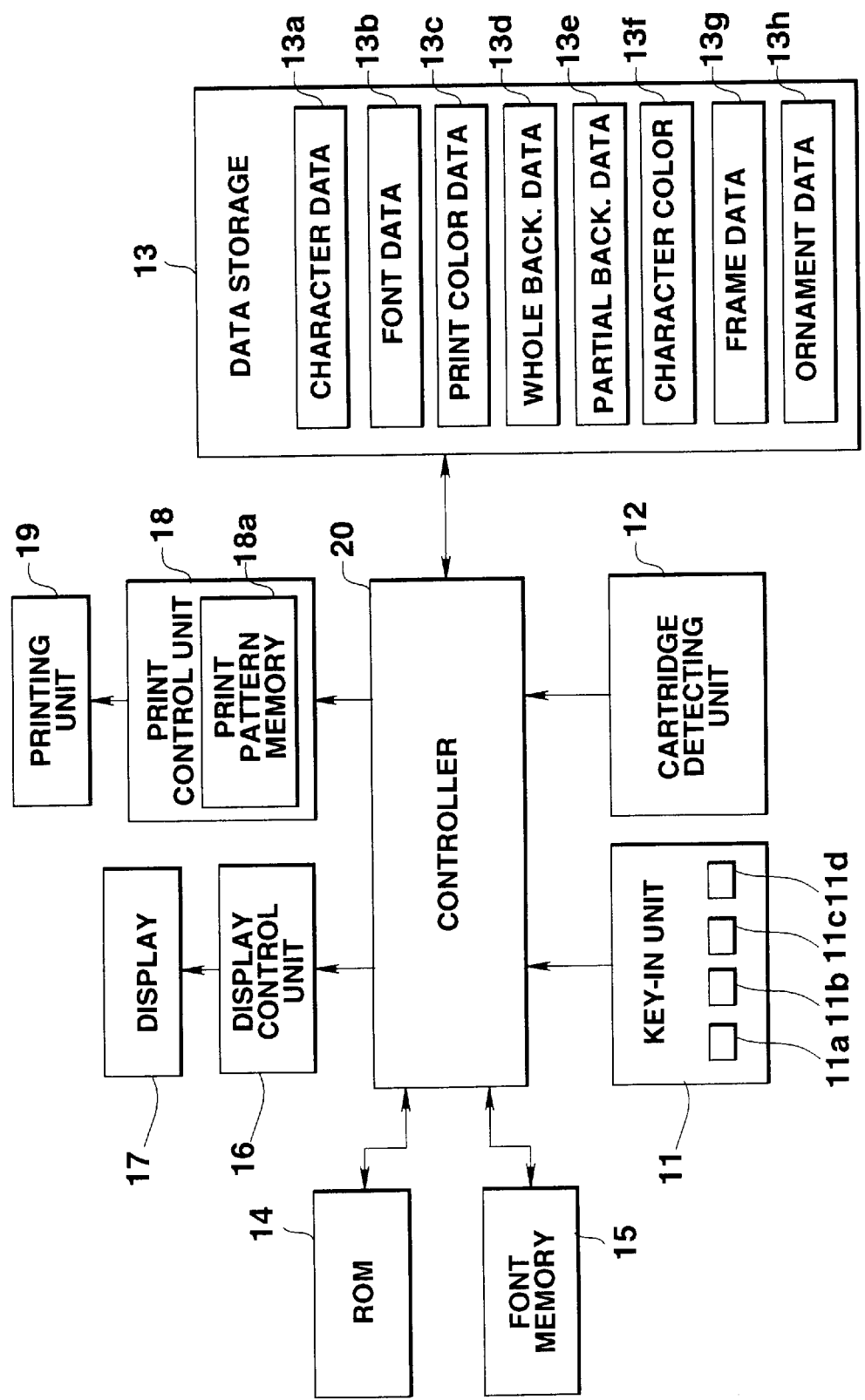

(STANDARD CHARACTERS)

(BLANK CHARACTERS)

(SHADOWED CHARACTERS)

SWITCH SW2 ON

SWITCH SW2 OFF

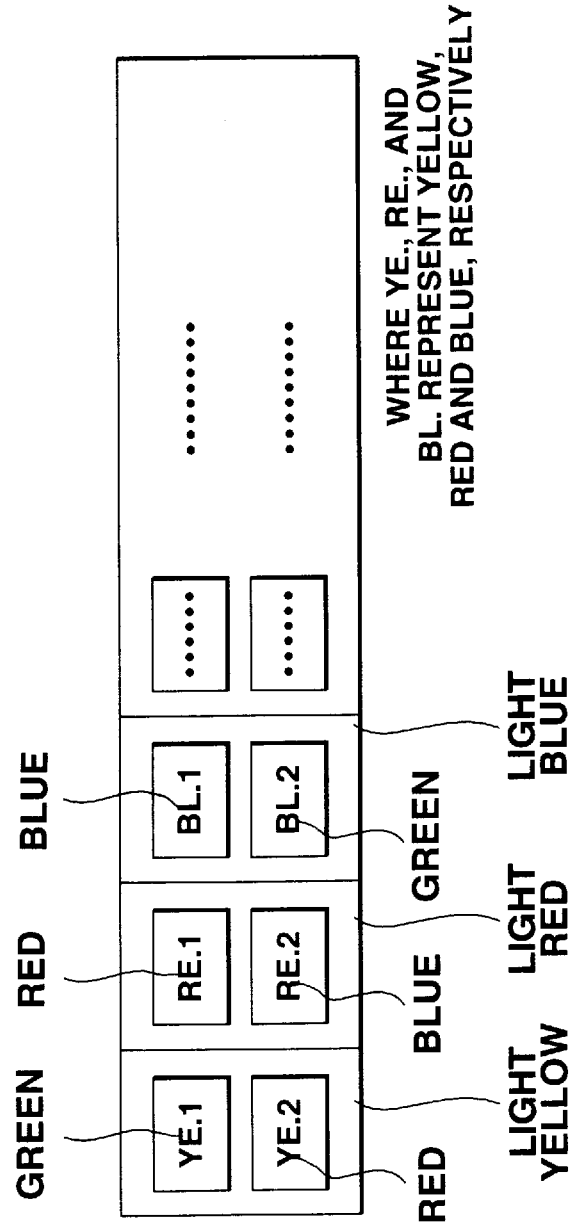

PRINTERS

BACKGROUND OF THE INVENTION

The present invention relates to printers capable of performing color printing, and more particularly to a printer capable of performing color printing by means of a simple operation.

Conventionally, tape printers are known which produce a label by printing input character, symbol, and figure data on a tape-like printing medium and which cut the printed tape portion.

One conventional tape printer produces a label by setting a tape cartridge which contains a printing tape and an ink tape in the printer and transferring ink in the ink tape to the printing tape. Thus, the printing colors transferred to the label tape are limited to the color of the ink tape contained in the tape cartridge. Thus, the characters, character ornaments, etc., are all printed in the same color and hence the expression force can be insufficient.

Since a combination of colors of label and ink tapes is fixed for each tape cartridge, a tape cartridge is required to be prepared for each combination of colors of a label and characters to be printed on the label and to be replaced with another, if required. Thus, operation is complicated.

In order to solve such problems, the use of a printing tape cartridge which contains a multi-color printing ink tape could be considered. In this case, even when any one of monochromatic and color printing tape cartridges is set, it is desired to print characters, symbols, etc., appropriately.

It is not preferable to specify a print color when data, for example, on characters to be printed are input with a monochromatic printing tape cartridge having been set because only monochromatic printing can be performed on the tape of the cartridge.

In some cases, data having no color information input in a state where a monochromatic printing tape cartridge is set can be printed in a state where a color printing tape cartridge is set. In this case, there are two possible measures to be taken, one of which is displaying an error message and then stopping the printing, and the other of which is printing all the data in black.

When the printing is stopped, it is required to cause the user either to specify newly a print color or to exchange the set tape cartridge with a conventional one, which is troublesome for the user. The measure to taken to print all data in black nullifies the purpose of using a color printing tape cartridge and only produces the same result of printing as the conventional method.

It is desired that the tape printer should be small and lightweight so as to be easy to carry and inexpensive from a standpoint of its character. Thus, a portable tape printer is only capable of mounting thereon a display having a small display screen in which the number or quantity of data to be displayed is limited. Thus, even when the user tries to set print colors, using this small display screen, it is difficult for the user to finely set the colors of data to be printed and hence the color setting work is troublesome. Therefore, it is difficult to produce a label with an ideal combination of colors. As the case may be, characters and their background can be specified in the same color, which can lead to a failure in which a label on which characters can not be discriminated could be produced.

It is therefore an object of the present invention to provide a printer capable of printing input data in appropriate colors even when no print color of the data is specified.

Another object of the present invention is to provide a printer capable of easily printing data in an expressive colorful manner.

SUMMARY OF THE INVENTION

In order to achieve the above objects, according to a first aspect of the present invention, there is provided a printer comprising:

a cartridge received in a cartridge receiving space in a printer body, the cartridge having therein a printing medium and a color printing ink ribbon containing a plurality of different color inks;

printing means for printing data on the printing medium with the ink ribbon;

input means for inputting to the printer printing data for which no print color is specified;

storage means for storing the printing data input by the input means;

setting means for automatically setting at a predetermined color a print color in which the input printing data is printed; and print control means for causing the printing means to operate to print on the printing medium the printing data stored in the storage means in the predetermined color set by the setting means.

In the first aspect of the present invention, the input printing data is printed in the predetermined color even when the print color is not specified. Thus, color printing is easily achieved.

According to a second aspect of the present invention, there is provided a printer comprising:

input means for inputting printing data to the printer and a plurality of ornament data for ornamenting the printing data;

color combination storing means containing data on a plurality of combinations of different colors beforehand for the printing data and the plurality of ornament data for ornamenting the printing data;

select means for selecting one of the plurality of combinations of different colors whose data are contained in the color combination storing means; and printing means for printing on a printing medium the printing data and ornament data input by the input means in the combination of colors selected by the select means.

In the second aspect of the present invention, by selecting only one among from the plurality of combinations of colors, the printing data and its ornament data are printed appropriately in the selected combination of colors.

According to a third aspect of the present invention, there is provided a printer comprising:

input means for inputting printing data and color or monochromatic printing ornament data for specifying and ornamenting an ornamental area for the printing data;

correspondence setting means for setting color and monochromatic printing ornament data in corresponding relationship;

receiving means for selectively receiving one of multi-color and monochromatic printing mediums therein;

determining means for determining whether the printing medium received in the receiving means is for multi-color or monochromatic printing; and printing means for printing the ornamental area for the printing data specified by the color printing ornament data in accordance with the corresponding monochromatic printing ornament data and the contents of the correspondence setting means when the determining means determines that the printing medium is for monochromatic printing, and for printing the ornamental area for the printing data specified by the monochromatic printing ornament data in accordance with the corresponding color printing ornament data when the determining means determines that the printing medium is for multi-color printing.

According to the third aspect of the present invention, color printing data and monochromatic printing ornament data are set beforehand in corresponding relationship. Thus, when it is determined that the printing medium is for monochromatic printing, the color printing ornament data is changed to the monochromatic printing ornament data, which is then printed, whereas when it is determined that the printing medium is for color printing, the monochromatic printing ornament data is changed to the color printing ornament data, which is then printed. That is, compatibility between color and monochromatic printing data is ensured.

BRIEF DESCRIPTION OF THE DRAWINGS

FIG. 1 is a block diagram of a first embodiment of a printer according to the present invention;

FIG. 19 illustrates a printed arrangement of combinations of colors.

DESCRIPTION OF THE PREFERRED EMBODIMENT

Figure 2A:
FIGS. 2A, 2B and 2C show a standard, an outline, and a shadowed font, respectively, used in the first embodiment.

Embodiments of a tape printer according to the present invention which prints any characters, symbols, etc., on a tape-like printing medium will be described with reference to the accompanying drawings.

First Embodiment:

FIG. 1 is a block diagram of a first embodiment of the inventive tape printer which is provided with a key-in unit 11, a cartridge detecting unit 12, a data storage (RAM) 13, a ROM 14, a font memory 15, a display control unit 16, a display 17, a print control unit 18, a printing unit 19 and a controller 20.

The key-in unit 11 is provided with character keys 11a, a font specifying key 11b, a print key 11c, and a print color specifying key 11d used to input information on characters, symbols, etc., to be printed.

Figure 2B:
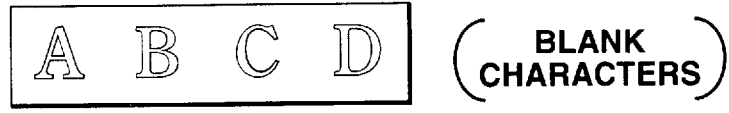
Figure 2C:

The character keys 11a include alphabetical keys, and a ten-key unit for inputting data, for example, on characters, symbols, numerals, to be printed. The font specifying key 11b is used to specify a font of input characters to be printed. In the embodiment, the font to be specified is a standard one of FIG. 2A, an outline one of FIG. 2B, and a shadowed one of FIG. 2C. The print key 11c is used to command print starting. The print color specifying key 11d is used to specify a print color.

The cartridge detecting unit 12 is comprises switches SW1 and SW2 in which the corresponding actuators (not shown) are actuated depending on the shape of the tape cartridge 31 to output detection signals and an information encoder (not shown) which encodes the output detection signals from the switches SW1 and SW2 and outputs the result as detected color information to the controller 20.

Figure 3A:
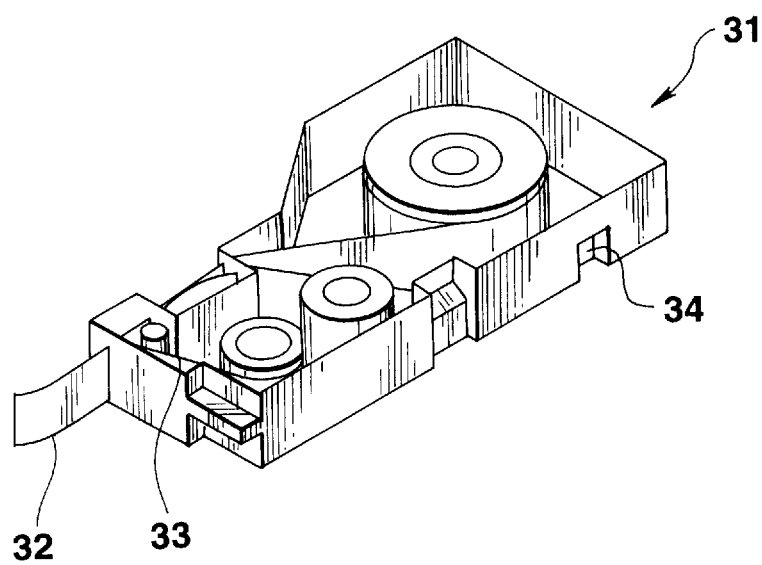
FIGS. 3A and 3B show the internal structure of a tape cartridge set in the printer and the structure of an ink tape for color printing, respectively.

As shown in FIG. 3A, the tape cartridge contains a tape 32 on which a label is printed (hereinafter referred to as a label tape) as a printing medium and an ink tape 33 the ink of which is transferred to the label tape to print data on the label tape 32. The label tape 32 has an adhesive on its back covered with an peelable paper strip.

In the embodiment, a monochromatic printing tape cartridge 31M which contains a monochromatic printing ink tape 33 and a color printing tape cartridge 31C which contains a color printing ink tape 33 are prepared. If there is no need to discriminate cartridges or their tapes from each other, reference symbol 31 is used while if necessary, reference symbol 31M or 31C is used.

A label tape 32 contained in the monochromatic printing tape cartridge 31M is either white or red while a label tape 32 contained in the cartridge 31C is white.

Figure 3B:
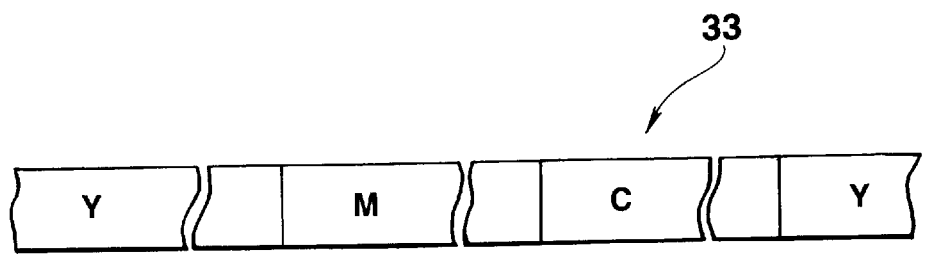

As shown in FIG. 3B, the color printing ink tape 33 has Y (yellow), M (Magenta) and C (cyan) ink areas arranged repeatedly in this order. By a combination of those three color inks, superimposed multi-color printing is achieved.

The data storage 13 stores data input from the key-in unit 11 and data set by the controller 20. The data storage 13 is composed of a character data storage area 13a which stores in the form of a character code character data input by the key-in unit 11, a font data storage area 13b which stores font data to be set for the character data stored in the character data storage area 13a, and a print color data storage area 13c which stores print color data for the character data stored in the character data storage area 13a. In a second embodiment to be described later, the print color data storage 13c further stores data on the background color of a label tape. In a third embodiment to be described later, the data storage 13 further includes a whole background data storage area 13d, a partial background data storage area 13e, a character color data storage area 13f, a frame data storage area 13g, and an ornament data storage area 13h.

In FIG. 1, ROM 14 contains programs in accordance with which the controller 20 which may be composed of a microprocessor controls the whole operation of the printer. ROM 14 also contains various Table data to be described later.

A font memory 15 contains pattern data of characters and symbols such as a standard, an outline and a shadowed font and thick fonts.

The display 17 is comprises a liquid crystal display which displays data to be printed. The display control unit 16 controls the display 17 under the control of the controller 20 to display data on the display 17.

The printing unit 19 is provided with a cartridge accommodating space 41 (FIG. 4) in which the tape cartridge 31 is set or received, a thermal head which melts and transfers ink on the ink tape 33 to the label tape 32, a tape conveyance mechanism which conveys the ink tape 33 and label tape 32, and prints data under control of the print control unit 18.

The print control unit 18 controls the printing unit 19 to print data fed from the controller 20 and has a print pattern memory 18a in which the data is spread as a print dot pattern.

The controller 20 may comprises a microprocessor to control the operation of the whole printer, for example, the character inputting operation, font specifying operation, the printing operation and the display operation.

Figure 4A:
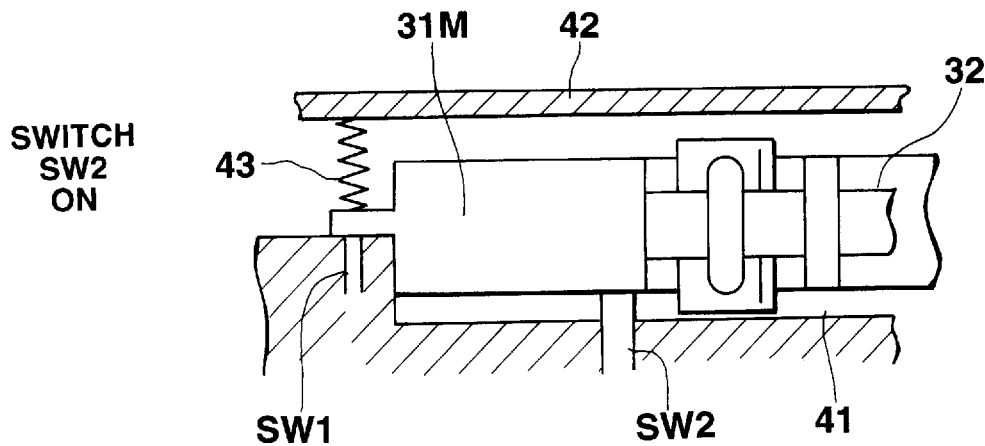
FIGS. 4A and 4B illustrate a monochromatic and a color printing tape cartridge, respectively, set in the printer.
Figure 4B:
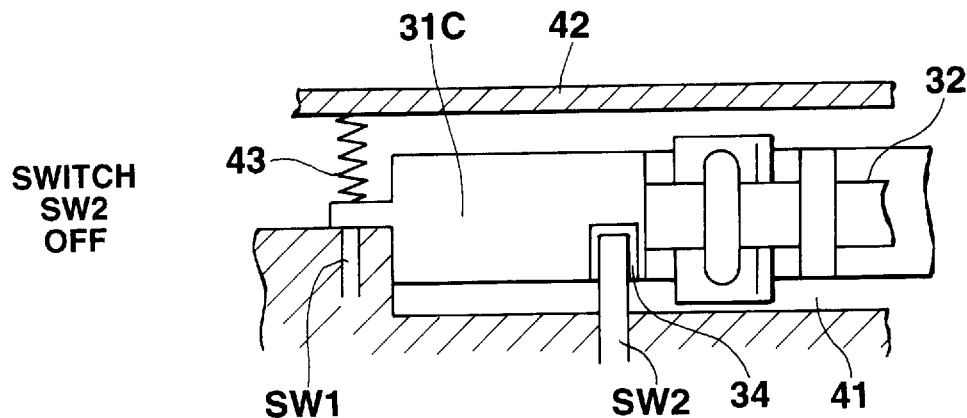

A method of detecting the kind of the tape cartridge 31 by the cartridge detecting unit 12 will be described next specifically with reference to FIGS. 4A and 4B and Table 1 below.

TABLE 1

|   | Kind of tape cartridge | Switch SW1 | Switch SW2 |
|---|---|---|---|
| A | monochromatic | on | on |
| B | color | on | on |
| C | unset | off | off |

Although not shown, the printer includes a cutter mechanism which is operated by an external operating lever provided in the printer to cut from an unprinted label tape portion that portion of the label tape 32 which was printed by the printing unit 19. In the state where the tape cartridge 31 is set in the cartridge accommodating space 41 of the tape printer with the cover 42 being closed, as shown in FIG. 4A, B, the tape cartridge 31 is biased by a spring 43 with a switch SW1 being pressed by the cartridge to be on. In the case of the cartridge being a monochromatic one, both switches SW1 and SW2 are on, as shown in FIG. 4A. In the case of the printing tape cartridge being a color one, a recess 34 is provided which receives the switch SW2 to avoid its operation to thereby keep the switch SW2 in an off state, as shown in FIG. 4B.

Table 1 indicates the on/off state of the switch SW1 caused depending on the setting/non-setting of the tape cartridge 31 in the cartridge receiving space 41 and the on/off state of the switch SW2 caused depending on the kind of the tape cartridge 31. When the two switches are on, they output corresponding signals of a predetermined voltage whereas when they are off, they output no signals. Table 1 which shows the "on" and "off" states of the switches therein is contained as having corresponding "1" and "0" data, respectively, in ROM 14. The controller 20 determines the presence/absence of the tape cartridge 31 in the receiving space 41 and the kind of the tape cartridge by referring to Table 1 in accordance with the detected color information which was obtained by encoding the detection signals output from the switches SW1 and SW2 of the cartridge detecting unit 12.

Figure 5:
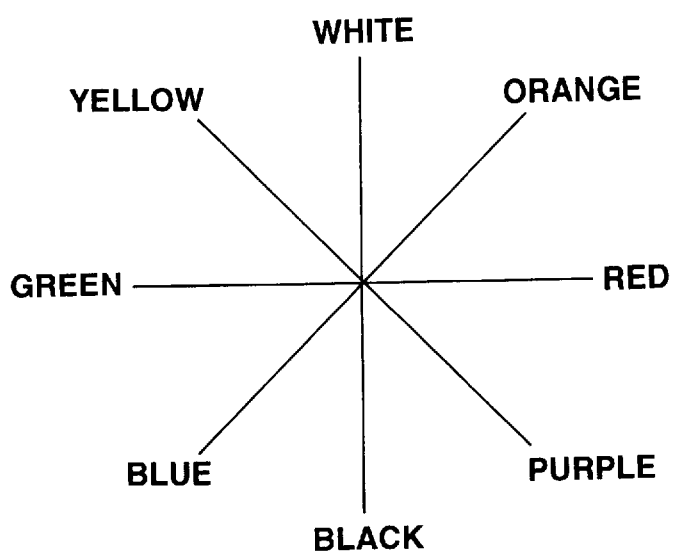
FIG. 5 illustrates the relationship between colors used in printing.
Figure 6:
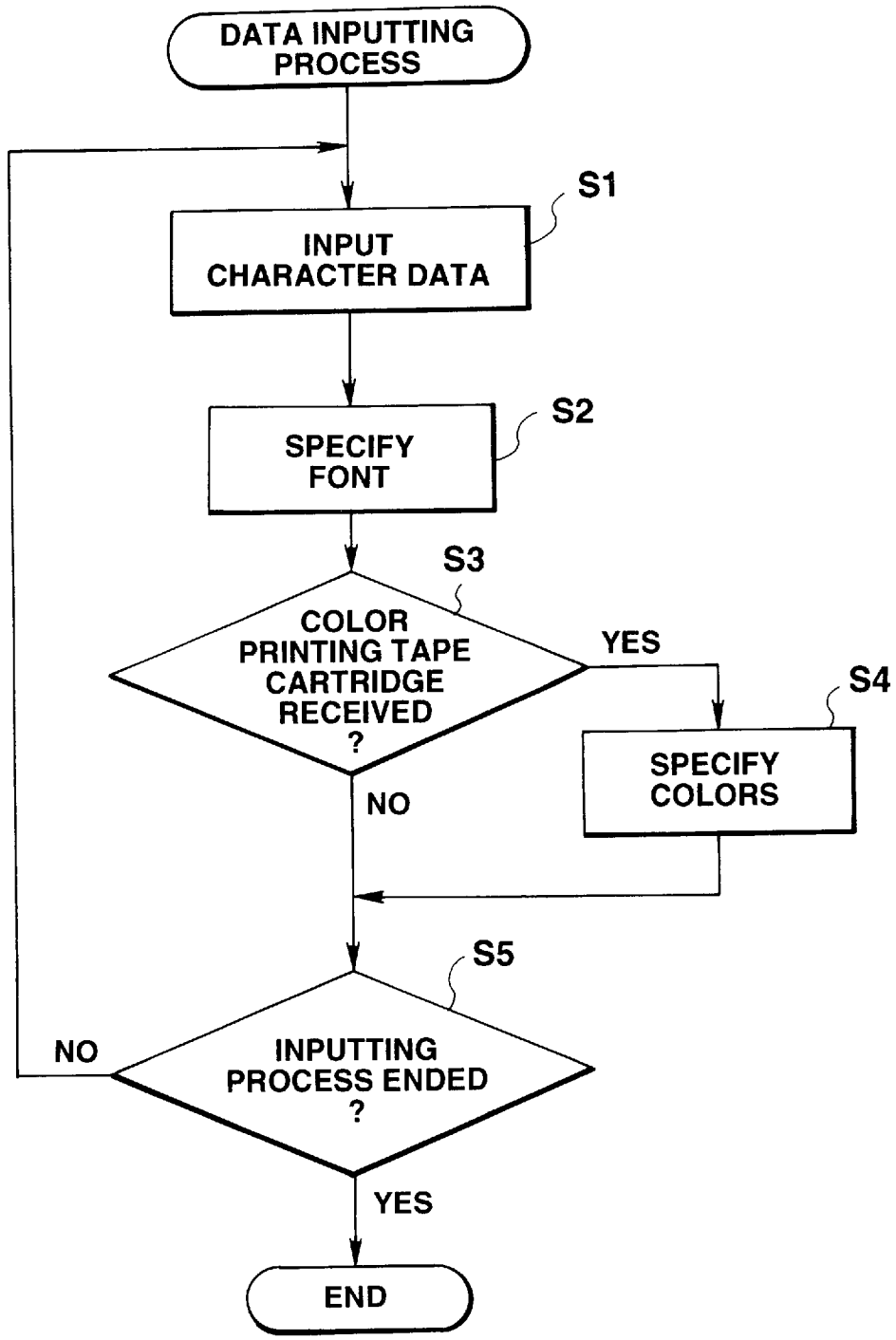
FIG. 6 is a flow chart indicative of a character inputting process performed in the first embodiment.

Print colors in which data are printed in the tape printer will be described next. In the embodiment, the print colors are white, orange, red, purple, black, blue, green and yellow; that is, the three primary colors, their intermediate colors, white and black, as shown in FIG. 6, in which the colors are arranged so that adjacent colors except white and black belong to the same color system. In FIG. 5, any opposing colors are in opponent color relationship.

These colors are given corresponding numbers "0"–"7" as shown in Table 2 below.

TABLE 2

| Color | white | orange | red | purple | black | blue | green | yellow |
|---|---|---|---|---|---|---|---|---|
| No. | 0 | 1 | 2 | 3 | 4 | 5 | 6 | 7 |

The colors having numbers which are in ±1 relationship belong to the same system while the colors having numbers which are in ±4 relationship are opponent ones.

Of course, the number of colors is not limited to eight, but nine or more colors may be used. In addition, the color numbers may be changed.

The operation of the tape printer as the first embodiment will be described next. In the printer, the tape cartridge 31 is replaceable. If no print colors are set for data such as characters to be printed, a monochromatic cartridge may be used for printing purpose or data may be printed in monochrome.

As described above with reference to the conventional techniques, such technique is inefficient and difficult to produce a multi-colored impressive label.

When data which has no specified print color is printed in color in the present embodiment, appropriate colors are set for the data in accordance with a predetermined standard and the data is then printed to thereby produce a multi-colored impressive label efficiently.

A method of inputting character data to be printed will be described with reference to a flow chart of FIG. 8. First, the user operates the character keys 11a of the key-in unit 11 to input printing character and symbol data (step S1). The input data are sequentially stored via the controller 20 into the character data storage area 13a of the data storage 13.

The user then operates the font specifying key 11b of the key-in unit 11b to specify font data of input characters (step S2). The specified font data is stored via the controller 20 into the font data storage area 13b of the data storage 13.

Thereafter, the controller 20 determines whether the set tape cartridge 31 is for monochromatic or color printing in accordance with a signal from the cartridge detecting unit 12 (step S3).

When the color printing tape cartridge 31C is set, the controller 20 displays a print color setting screen which specifies print colors of the respective portions of a printing pattern. The user operates the print color specifying key 11d to specify print colors of the respective characters in accordance with the screen display.

For example, the user specifies the color of the background of the label tape 32 (hereinafter referred to also as "label color"). In addition, (1) when a standard font is specified as the font of printing character data, the user specifies the color of its characters, (2) when an outline font is specified, the user specifies the respective colors of the outline and inside of its outline characters, and (3) when a shadowed font is specified, the user specifies the respective colors of the body and shadow of its shadowed characters (step S4).

The controller 20 stores the specified print color data in the print color data storage area 13c of the data storage 13.

If the set cartridge 31 is monochromatic, no print colors are specified.

The controller 20 then determine s whet her the inputting process has ended (step S5). If not, control returns t o the process at step S1 to continue the inputting process.

Data printing will be described next with reference to a flow chart of FIG. 7. When the character data have been input and are to be printed, the user presses the print key 11c.

Figure 7:
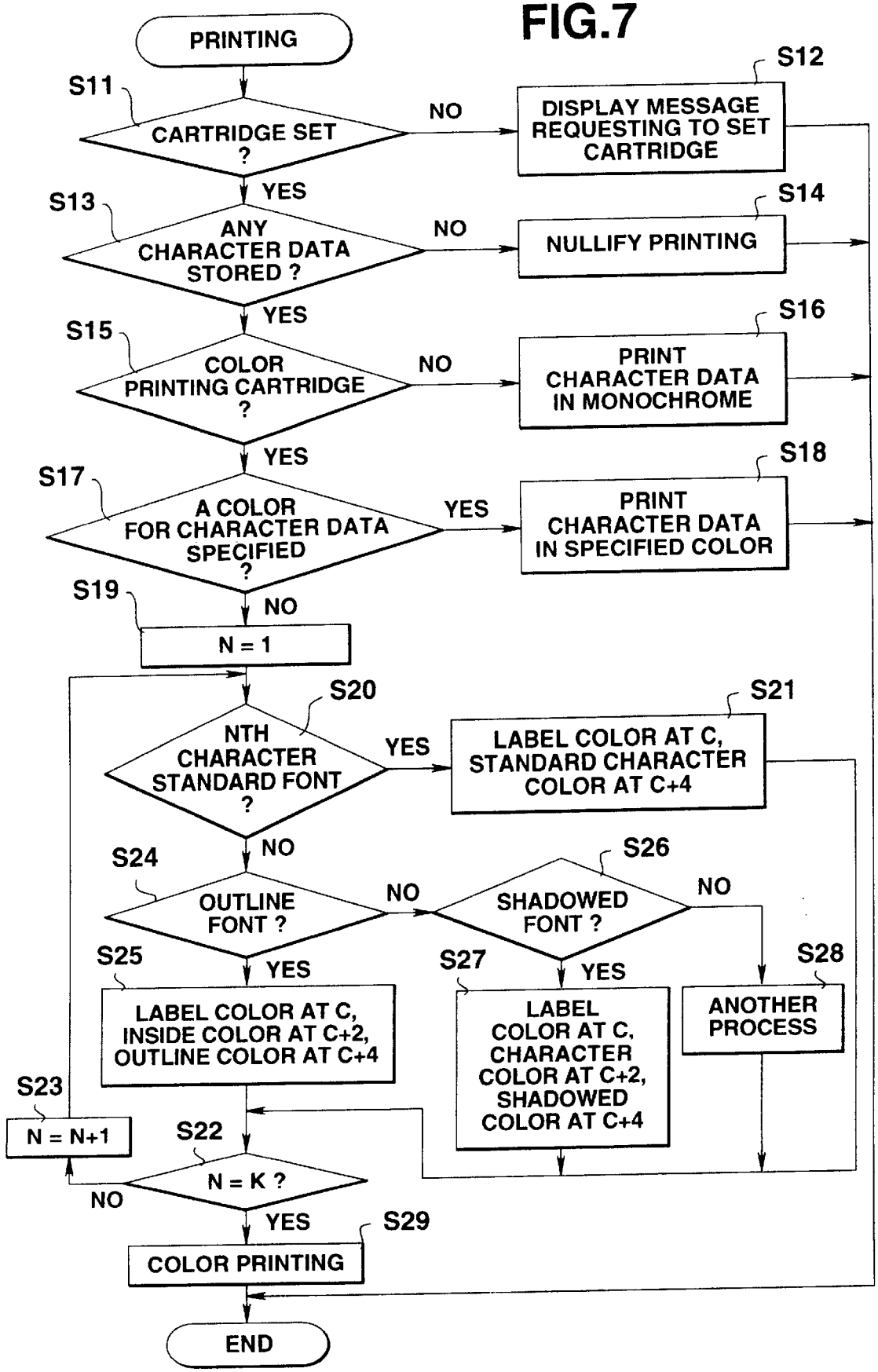
FIG. 7 is a flow chart indicative of a printing process performed in the first embodiment.

In response to this operation, the controller 20 starts the data printing process of FIG. 7.

The controller 20 determines on the bas is of a signal from the cartridge detecting unit 12 whether any tape cartridge 31 has been set (step S11).

If not, the controller 20 displays a message which requests the setting of a cartridge 31 via the display control un i t 16 on the display 17 (step S12) and terminates the printing process.

If a cartridge 31 has been set, the controller 20 determines whether printing character data have been stored in the character data storage area 13a of the data storage 13 (step S13).

If not, the controller 20 performs a print nullifying process (step S14) and terminates the printing operation.

When character data has been stored in the character data storage area 13a, the controller 20 determines in accordance with a signal from the cartridge detecting unit 12 whether the set tape cartridge 31 is for monochromatic printing or color printing (step S15).

If the set tape cartridge tape 31 is for monochromatic printing, the controller 20 controls the printing unit 19 via the print control unit 18 to print the character data in monochrome (in the color of the ink tape 33 contained in the tape set cartridge 31) whether a print color is set (step S16).

If the tape cartridge 31 is for color printing, the controller 20 determines on the basis of the print color data stored in the print data storage area 13c of the data storage 13 whether the color of printing character data is specified (step S17). If so, the printing unit 19 prints the character data in the specified color (step S18).

In order to set a print color when no print color has been specified, the controller 20 reads Nth font data with the character number N being set as "1" from the font data storage area 13b of the data storage 13 (step S19) and determines whether the font involved in the read font data is a standard one (step S20).

If so, the controller 20 determines the color of the characters to be printed, as follows.

Figure 8A:
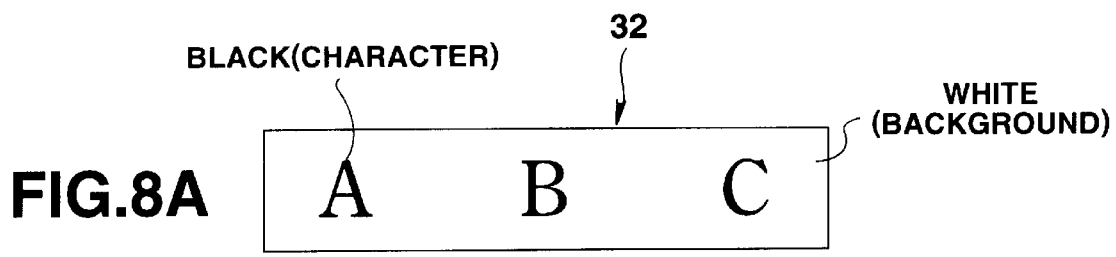
FIGS. 8A, 8B and 8C show a standard, an outline and a shadowed font, respectively, printed in color on a label tape by the tape printer in the first embodiment.

First, the controller 20 sets the background color of the label tape 32 at a number C (one of "0"–"7"), and the character color at a number (C+4) (step S21). However, since the background color of the color printing label tape 32 is fixed at white (No. 0) in this embodiment, as described above, the character color is set at black (No. 4), as shown in FIG. 8A.

When the color number is not less than 8, it is set at a number minus 8. The controller 20 then stores data on the set print color in the print color data storage area 13c of the data storage 13.

When the font data specified is not standard one, the controller 20 determines whether or not the font is an outline font (step S24).

If so, the controller 20 sets a print color as follows. A character of the outline font is composed of an outline and its inside. When the controller 20 sets the background color of the label tape 32 at No. C (one of "0"–"7"), it also sets the inside color of the outline character at No. (C+2) and the outline color at No. (C+4) (step S25).

Figure 8B:
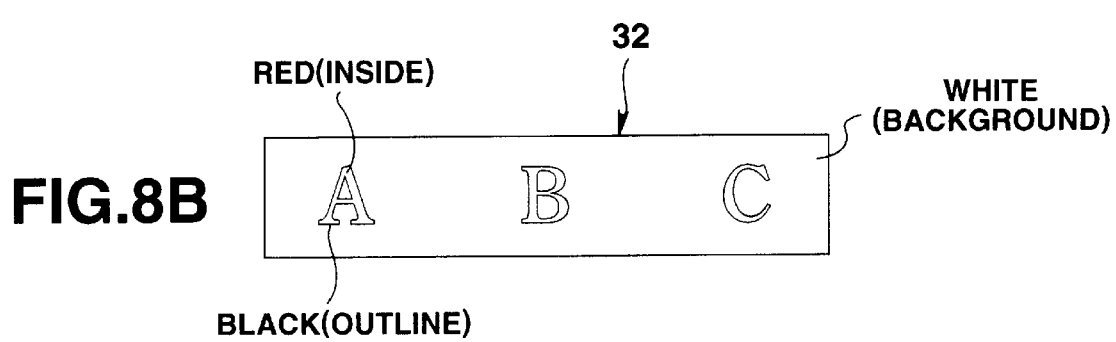

Since in this embodiment the background color of the color printing label tape 32 is white (No. 0), the inside color and the outline color of the outline characters are set at red (No. 2) and black (No. 4), respectively, as shown in FIG. 8B. The controller 20 stores data on the set print colors in the print color data area 13c of the data storage 13.

When the controller 20 determines that the font is not an outline one at step S24, it determines whether the font is a shadowed one (step S26).

If so, the controller 20 sets a print color as follows. The shadowed character is composed of a character portion and its shadow portion. When the background color of the label tape 32 is C (one of "0"–"7"), the character color is set at No. (C+2) and the shadow color is set at (C+4) (step S27).

Figure 8C:
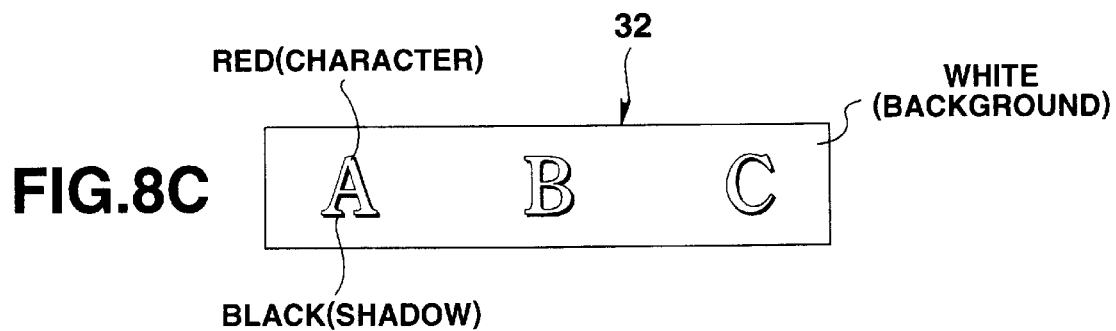

Since in the embodiment the background color of the color printing label tape 32 is white (No. 0), the character color and the shadow color are set at red (No. 2) and black (No. 4), respectively, as shown in FIG. 8C. The controller 20 stores data on the set print colors in the print color data storage area 13c of the data storage 13.

When the controller 20 determines at step S26 that the font is not a shadowed one, it performs another process (step S28).

When the processing at steps S21, S25, S27 and S28 ends, the controller 20 determines whether the character number N coincides with the end character number K, that is, whether print colors have been set for all the character data (step S22).

If not, the controller 20 updates the character number and reads font data (step S23) and its control returns to the determination process at step S20.

When the controller 20 determines at step S22 that the print colors have been set for all the character data, it reads from the data storage 13 printing character data and font data and feeds them to the print control unit 18, which reads from the font memory 15 font pattern data corresponding to the character data (codes) and character font data read from the data storage 13, writes font pattern data in the print pattern memory 18a, spreads data on a Y (yellow) print dot pattern in the print pattern memory 18a in accordance with the print color data and prints a Y pattern on the label tape 32 with the Y ink of the ink tape 33.

Subsequently, the print control unit 18 spreads data on an M (Magenta) print dot pattern in the print pattern memory 16a, rewinds the label tape 32, and prints an M pattern on the label tape 32 so as to be superimposed on the Y pattern with the M ink of the ink tape 33.

Similarly, the print control unit 18 also prints a C (cyan) pattern on the tape in a superimposing manner. Thus, the printing process (step S29) is terminated.

As described above, according to the tape printer of the first embodiment, when the user inputs characters, etc., without specifying the print color and commands printing in the state where a color printing tape cartridge 31C has been set, the printer determines the print color and performs a printing operation. Thus, even when the respective print colors are not specified, a color label is produced. The printing is achieved efficiently without the need for exchanging tape cartridges. If the user specifies a print color, the printing is performed in the specified color. Thus, the user can produce a label which satisfies the user's preference.

While in the above description the color of the label tape 32 contained in the color printing tape cartridge 31C is fixed at white, a plurality of different-color printing tape cartridges 31C, for example, for white, yellow and red, may be prepared so that any one of them is selectable.

For example, when a red label tape 32 is used and an outline font is specified, its outline color becomes green (No. 2+4) and its inside color becomes black (No. (2+2). In this case, it is required to determine the background color of the label tape 32 set in the tape cartridge 31 which is received in the cartridge receiving space 41. This determination may be achieved by a mechanism of FIG. 4C similar to that of FIG. 4A and B. The mechanism of FIG. 4C has four switches SW1, SW2, SW3, and SW4 which are two switches more than those of the mechanism of FIGS. 4A and 4B. The switch SW1 is used to detect the presence/absence of a tape cartridge 31 set in the cartridge receiving space 41. The switches SW2–SW4 are used to detect the color of the label tape 32 of the color printing cartridge 31C when same is set and to detect the setting of a monochromatic printing cartridge 31M.

The cartridge 31 has thereon one, two or three recesses 34 at corresponding one, two or three of the positions of the switches SW2–SW4. The switches positioned at the positions of the recesses 34 extend and are received in those corresponding recesses so as to be off whereas the switches which are not positioned at the recesses 34 are pressed by the wall of the cartridge to be on. The number and positions of recesses change depending on the color of a label tape 31 contained in the cartridge. The detected signals from the switches SW1–SW4 are encoded into 4-bit information by an information encoder (not shown) which cooperates with the switches SW1–SW4 to compose the cartridge detecting unit 12 and the 4-bit information is then output to the controller 20.

Table 3 below shows the operated/unoperated states of the switches SW1–SW4 occurring when seven kinds of color printing cartridges 31C and a monochromatic printing cartridge are respectively set in the tape printer and the operated/unoperated state of the switches SW1–SW4 occurring when no cartridge is set.

TABLE 3

| Label tape color/set | SW1 | SW2 | SW3 | SW4 |
|---|---|---|---|---|
| white (set) | on | off | off | off |
| orange (set) | on | off | off | on |
| red (set) | on | off | on | off |
| purple (set) | on | off | on | on |
| black (set) | on | on | off | off |
| blue (set) | on | on | off | on |
| yellow (set) | on | on | on | off |
| monochromatic (set) | on | on | on | on |
| unset | off | off | off | off |

Table 3 is stored in ROM 14 in which Table 3 contains "switch on" and "switch off" as "1" and "0" data, respectively. When a color printing cartridge 31C is set, the controller 20 determines the color of the label tape 31 by referring to Table 3 on the basis of the detected color information from the cartridge detecting unit 12.

Figure 4C:
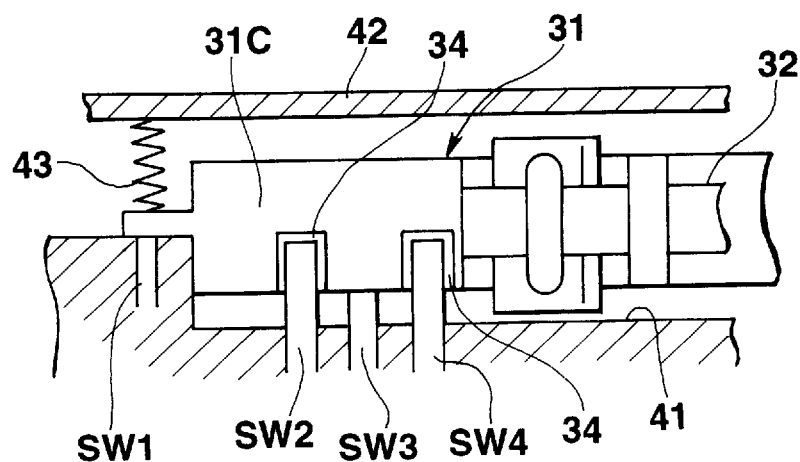
FIG. 4C illustrates detection of the color of a label tape of a cartridge.

The cartridge 31C of FIG. 4C has recesses 34 at the positions corresponding to the switches SW2 and SW4 and no recess at the position corresponding to the switches SW3.

Thus, the switches SW2, SW3 and SW4 are operated so as to be off, on and off, respectively. As will be obvious from Table 3, the cartridge 31C of FIG. 4C contains a red label tape 31.

While in the above description the automatic setting of the print colors of the respective portions of a printing pattern has been illustrated, the print color(s) of an ornamental pattern(s) of a halftone, underlines and/or frame for a character (s) may be set on the basis of the background color of the label tape and the character color. For example, when the label color or character color is C, the print color of the ornament may be set at No. (C+6).

While in FIG. 6 the data inputting process has been illustrated in order of character data inputting, font data specifying and print color data specifying, arrangement may be such that the colors of the respective portions of the printing pattern are set, for example, beforehand for each font and only character data are input in the data inputting process.

When characters for which no print colors are specified are printed using a color printing tape cartridge, the display 17 may display a screen which requests the user to select any one of the replacement of the tape cartridge with a monochromatic printing tape cartridge, the whole printing in black, and automatic setting of a print color such that the printing process is performed in accordance with the user's choice.

Second Embodiment:

While in the first embodiment the automatic setting of character colors, etc. to the inherent background color of a label tape has been illustrated, arrangement may be such that the user specifies any one of a print color of the background of a label tape and a print color of the characters and the printer sets the color of the other to the color specified by the user and prints the background and characters in those colors. A tape printer as a second embodiment which performs such printing operation will be described next.

The circuit structure of the tape printer of this embodiment, and its data inputting and printing operations are basically the same as the first embodiment. Thus, the features of the second embodiment different from first embodiments will be described next.

Figure 9:
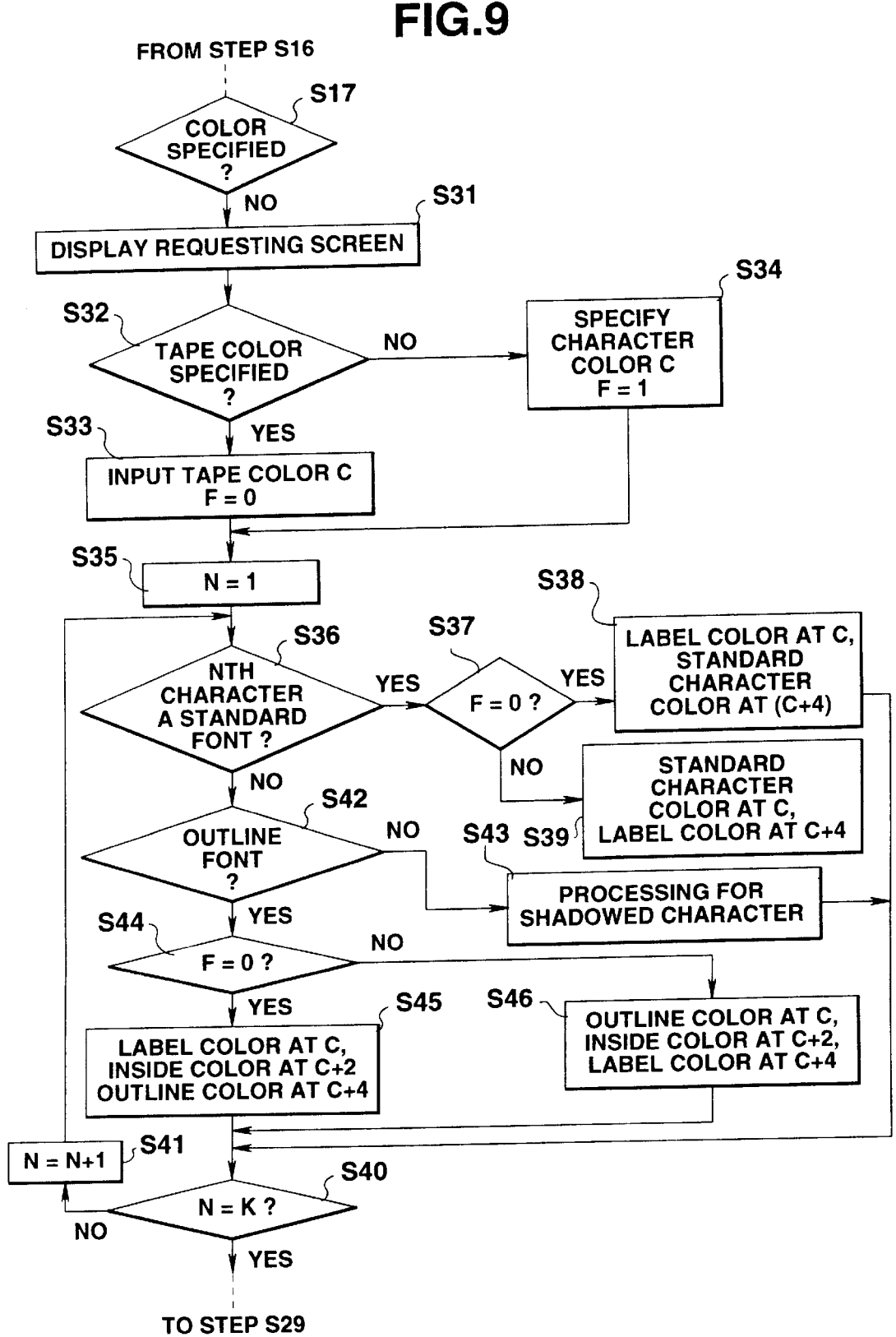
FIG. 9 is a flow chart indicative of a printing operation performed in a second embodiment.

When the controller 20 determines at step S17 of FIG. 7 in the first embodiment that there is no specified print color for the printing data, the controller 20 displays via the display control unit 16 on the display 17 a screen which requests the operator to specify one of the print color of the background of the label tape and the print color of the characters, as shown in FIG. 9, in the second embodiment (step S31).

When in response to this screen display, the user selects one of the colors by operating the key-in unit 11, the controller 20 determines the contents of the selection (step S32).

When specifying a printing background color of the label tape 32, the user specifies any desired color (No. C), using the print color specifying key 11d of the key-in unit 11 (step S33).

The controller 20 stores data on the specified print color in the print color data storage area 13c of the data storage 13 and resets a print color setting flag F (F=0).

Also, when specifying the character color, the user keys in data on a desired color (No. C), using the print color specifying key lid (step S34).

The controller 20 stores data on the specified print color in the print color data storage area 13c of the data storage 13 and sets the flag F.

When the processing at steps S33, 34 ends, the controller 20 reads data on the first character from the character data storage area 13a of the data storage 13 (step S35) and determines on the basis of the font data stored in the font data storage area 13b whether the font specified for that character is a standard one (step S36).

If so, the controller 20 determines on the basis of the font data whether F=0 (step S37). If so, the controller 20 reads data on the number C of the print color of the background of the label tape 32 stored in the print color data storage area 13c of the data storage 13, and sets data on the print color of the characters at No. (C+4) (step S38). If F=1, the controller 20 reads data on the number C of the standard font color stored in the print color data storage area 13c of the data storage 13 and sets data on the print color of the background of the label tape 32 at No. (C+4) (step S39). Those set color data are stored in the storage area 13c.

When the processing at steps S38, S39 ends, the controller 20 determines whether the processing for all the respective characters has ended (step S40). If not, the controller 20 updates the character number N (step S41), and returns to the determining process at step S36.

When the controller 20 determines at step S36 that the font is not the standard one, the controller 20 determines whether the font is an outline one (step S42). If so, the controller 20 determines whether F=0 (step S44).

If F=0, the controller 20 reads data on the number C of the print color of the background of the label tape 32 stored in the data storage 13 and sets data on the print colors of the inside and outline of the characters at Nos. (C+2) and (C+4), respectively (step S45).

If F=1, the controller 20 reads data on the number C of the character color stored in the print color data storage area 13c of the data storage 13, and sets data on the color of the inside of the character at No. (C+2) and data on the print color of the background of the label tape at No. (C+4) (step S46). Those set color data are stored in the print color data storage area 13c.

When the processing at steps S45, 46 ends, the control passes to the determining process at step S40. When the controller 20 determines at step S40 that the processing for all the characters has ended, the control passes to step S29, where the controller 20 causes the printing unit 19 to perform color printing on the basis of the set data stored in the data storage 13.

Although omitted in FIG. 9, and also if the font is determined to be a shadowed one, the controller 20 sets the color in accordance with the value of the flag F as in the processing at step S42 (step S43).

As described above, in the second embodiment, since the background color of the label tape 32 or the character color can be specified in printing, a label more colorful than the first embodiment can be produced to the user's preference.

Figure 10A:
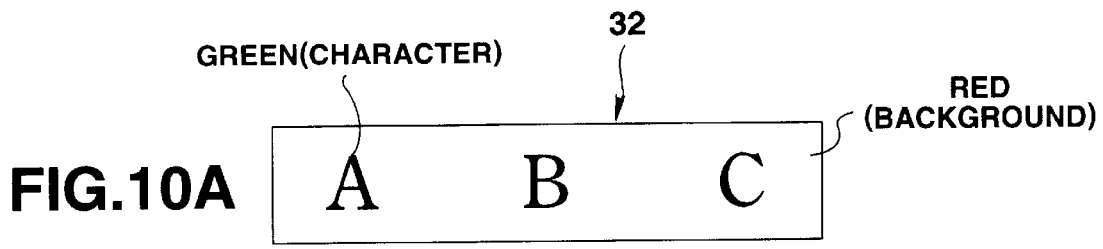
FIGS. 10A, 10B and 10C illustrate a standard, an outline, and a shadowed font, respectively, printed in color on a label tape by the tape printer in the second embodiment.
Figure 10B:
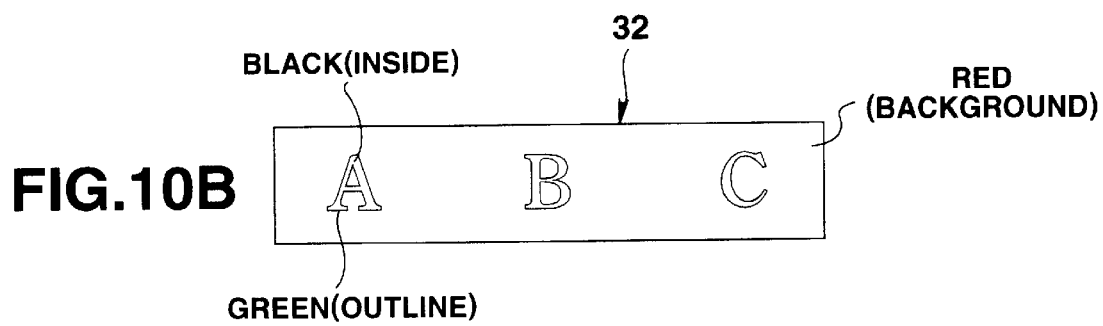
Figure 10C:
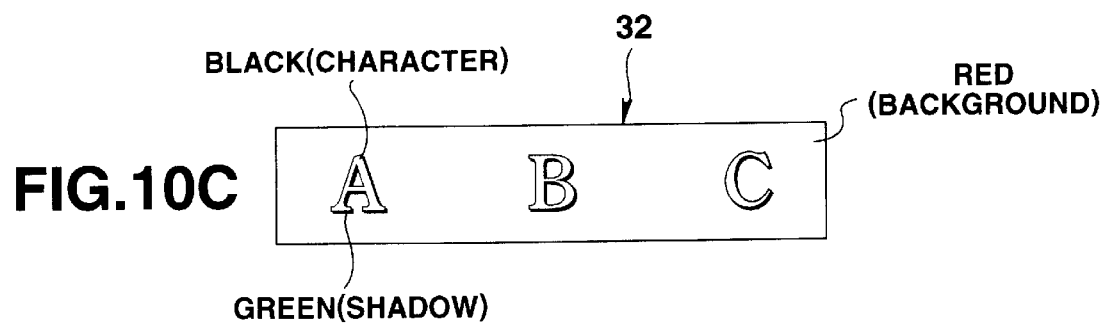

FIGS. 10A–10C illustrate labels produced when a standard, an outline, and a shadowed font are respectively specified, and when the print color of the background of the label tapes 32 is specified and set at red (No. 2) at steps S32 and S33, respectively, of FIG. 9.

The invention is applicable even when the user specifies a wrong combination of print colors. For example, when a standard font is specified, and also both the print colors of the characters and label background are specified as red at steps S4 of FIG. 6, the characters can not be recognized. In order to avoid such undesirable situation, the characters may be printed with a black outline for recognizing purposes.

Similarly, when an outline font is specified as a font, and both the print colors of the outline and label background are specified as red, the outline of the character can not be recognized. This applies also when the colors of a character of a shadowed font or its shadow and the label background are specified as the same. In such a case, at least one of the print colors of the characters or their outlines and the print color of the label background may be different from the color which the user has specified for recognizing purposes.

Figure 11:
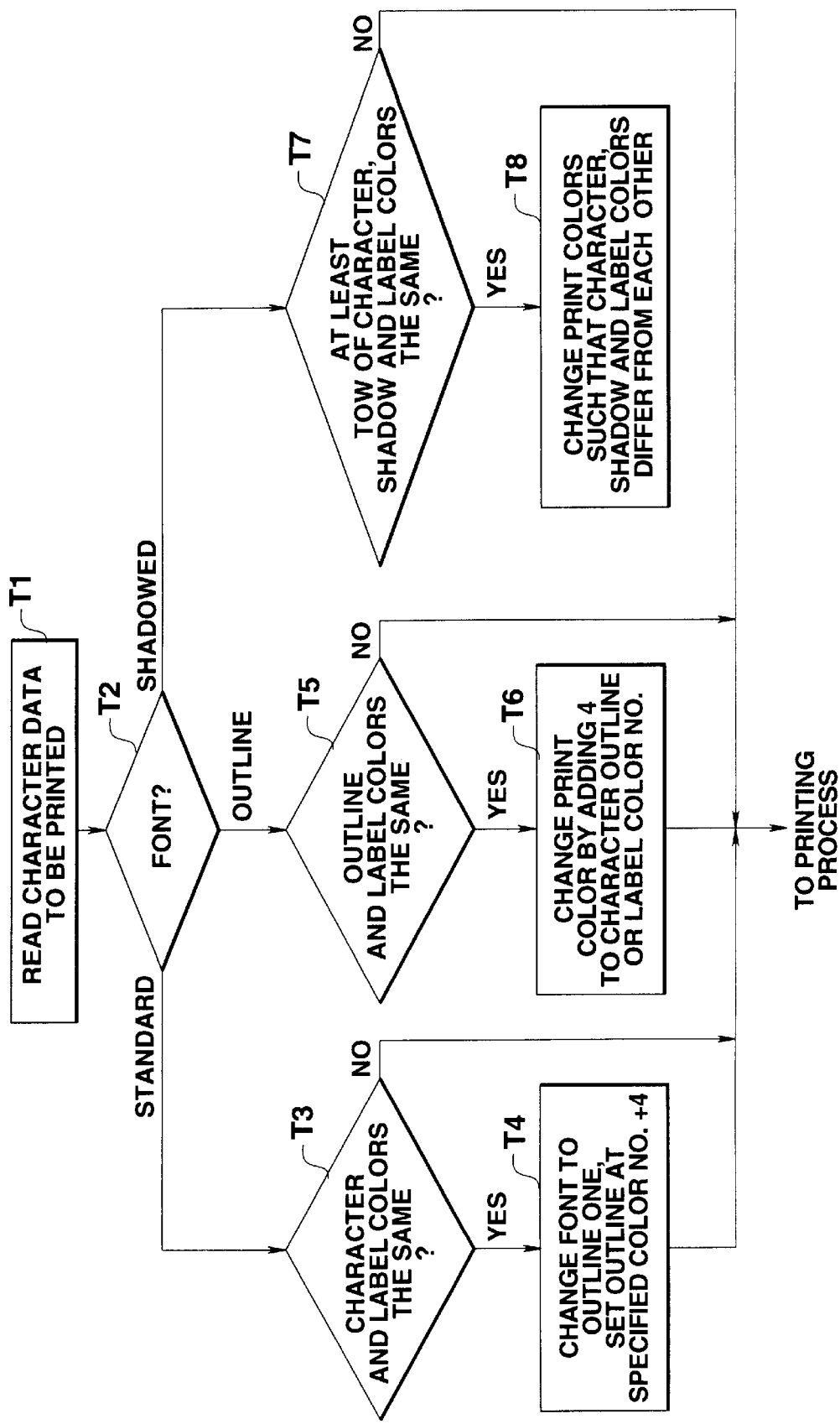
FIG. 11 is a flow chart indicative of an applied operation performed in the present invention.

In order to perform such processing, for example, the controller 20 reads data to be printed (printing data) in printing, as shown in FIG. 11 (step T1), checks the font (step T2), and if the font is a standard one, the controller 20 determines whether the print colors of the character and the label background are the same (step T3). If so, the controller 20 changes the font to an outline one, sets the print color of the character outline at the specified color number+4, for example, and sets the print color of the character inside at the specified one (step T4).

If the font is an outline one, the controller 20 determines whether the print color of the outline of the characters and that of the label background are the same (step T5). If so, the controller 20 adds, for example, 4 to the number of the print color of the character outline or label background to change its print color (step T6).

If the font is a shadowed one, the controller 20 checks whether at least two of the print colors of the character, shadow and label tape background are the same (step T7). If so, the controller 20 changes their print colors so as to be different from each other (step T8).

As described above, by changing the font and/or print colors and then printing the data in the changed colors, a label tape is produced in an appropriate color arrangement.

Similar processing is also applicable when the user specifies both the print colors of the inside and outline of the outline font as the same.

Similar processing is also applicable when any delineated graphs or figures have adjacent areas of the same color and these areas cannot be discriminated from each other. In such case, this problem can be solved by drawing a boundary line between the adjacent areas or changing the color of one of the adjacent areas such that the adjacent areas can be discriminated clearly from each other.

Third Embodiment:

While in the first and second embodiments the automatic setting of a print color for each of kinds of characters to be printed has been illustrated, the print color of, or combination of colors in, a whole label to be printed may be set automatically. A third embodiment of the tape printer according to the present invention which has such function will be described next.

This embodiment of the tape printer is basically the same in circuit structure, data inputting process and printing process as the first and second embodiments. The data storage 13 of the third embodiment includes whole background data storage area 13d which stores a whole background data, a partial background data storage area 13e which stores partial background data, a character color data storage area 13f which stores data on a character color to be set for character data, a frame data storage area 13g which when frame data is set, stores its data, and an ornament data storage area 13h which stores monochromatic printing ornament data. ROM 14 also stores data on Tables of combinations of colors to be used in this embodiment to be described later. The key-in unit 11 is provided with ornament specifying keys (not shown) to set a whole background color, a partial background color, a character color 2 and a frame color, and cursor keys to select a combination of print colors.

Table 4 below provided in ROM 14 of FIG. 1 contains data on a well harmonized combination of print colors for each label ornament.

TABLE 4

| Name | whole background color | partial background color | character color 1 | character color 2 | frame color |
|---|---|---|---|---|---|
| Yellow 1 | light yellow | light blue | green | light red | green |
| Yellow 2 | light yellow | light red | red | light blue | red |
| Red 1 | light red | light yellow | red | light blue | red |
| Red 2 | light red | light blue | blue | yellow | blue |
| Blue 1 | light blue | light red | blue | yellow | dark blue |
| Blue 2 | light blue | yellow | green | light red | green |

Figure 12:
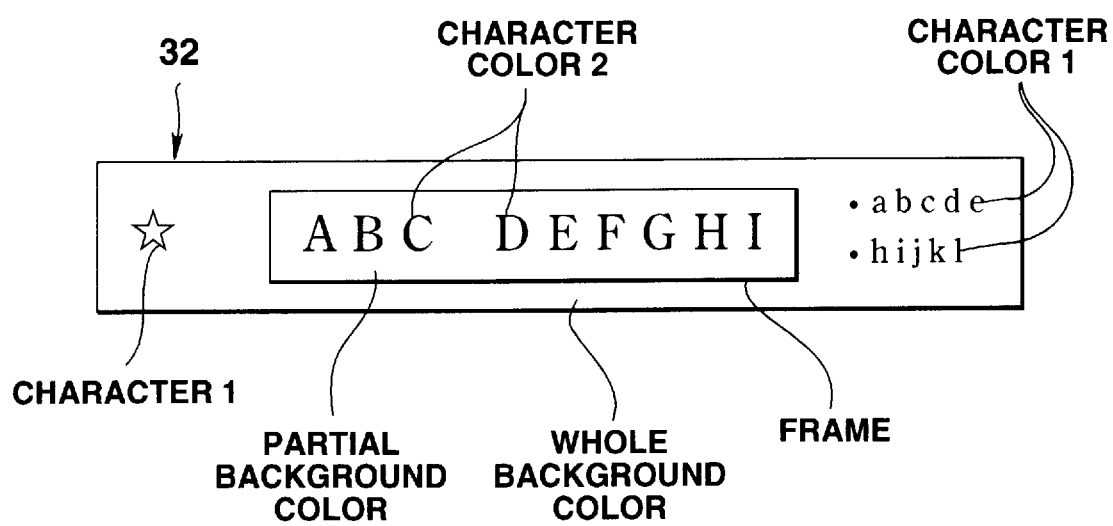
FIG. 12 illustrates the relationship between character data and ornament data.

In table 4, the whole background color implies the print color of the background of a label tape 32, as shown in FIG. 12, the partial background color implies the print color of the background of a character string specified beforehand in the character inputting screen set so as to be different from the whole background color to emphasize or discriminate that partial background.

The frame implies a colored one which is applied to a character string specified in the character data inputting screen so as to enclose the character string for emphasizing or discriminating purposes.

The character color 1 implies the print color of characters for which no ornaments are specified. The character color 2 implies a print color of the character string specified in the character data inputting screen and different from that of the character color 1 for emphasizing or discriminating purposes.

The whole background color, partial background color, character color 2 and frame color except for the character color 1 are set by specifying the range of characters when data on the characters to be printed are input in the character data inputting screen. These set data are stored along with the character data in the whole background data storage area 13*d*, partial background data storage area 13*e*, character color data storage area 13*f*, and frame data storage area 13*g*.

Figure 13:
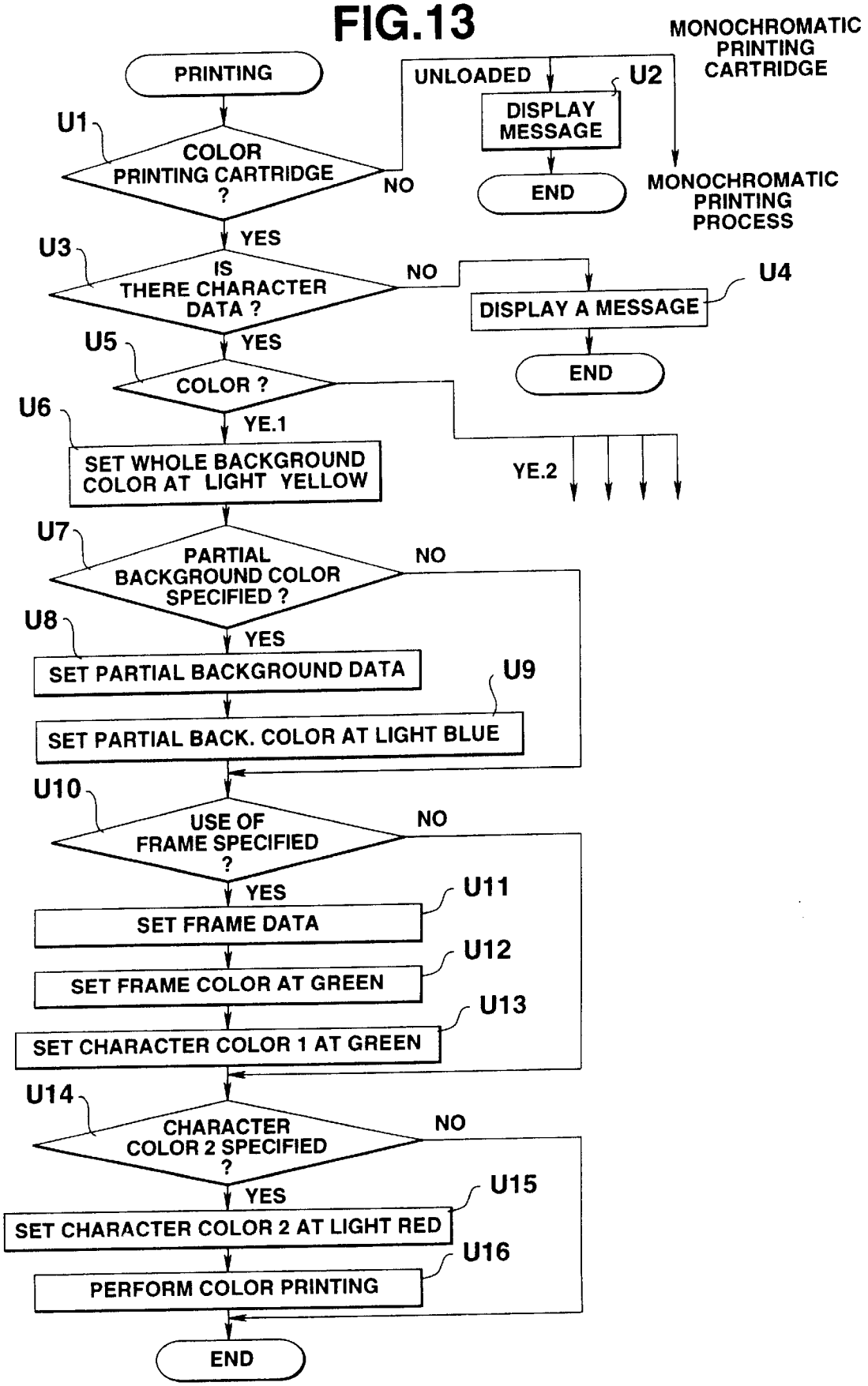
FIG. 13 is a flow chart indicative of a color printing operation performed by a printer of a third embodiment.

When the print key 11*c* of the key-in unit 11 is operated after the printing character data and the respective ornamental colors are specified, the controller 20 starts a printing process concerning the specified matters in accordance with a flow chart of FIG. 13.

First, the controller 20 determines in accordance with the determination of the cartridge detecting unit 12 whether a tape cartridge 31 is set, and if so, whether the set tape cartridge is for color printing or monochromatic printing (step U1).

If the controller 20 determines that no tape cartridge 31 is set, it displays a message that a tape cartridge should be set (step U2) and terminates its processing. If the controller 20 determines that a monochromatic tape cartridge 31M has been set, the controller 20 performs a regular monochromatic printing process.

If the controller 20 determines that a color printing tape cartridge 31C has been set, it determines on the basis of the contents of the character data storage area 13*a* of the data storage 13 whether there is any printing character data (step U3). If not, the controller 20 displays a message that there is no printing character data (step U4) to terminate its operation.

Figure 14:
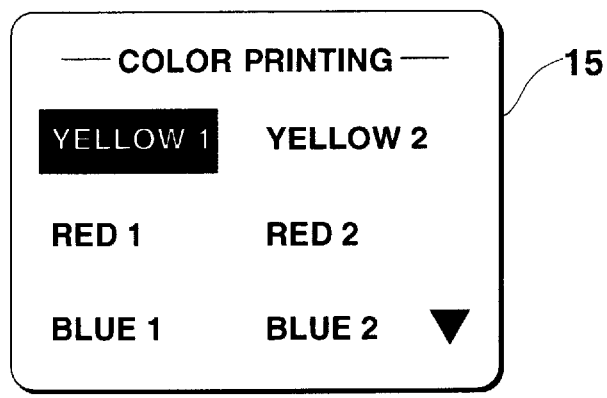
FIG. 14 illustrates a display screen where a combination of print colors is selected.
Figure 15A:
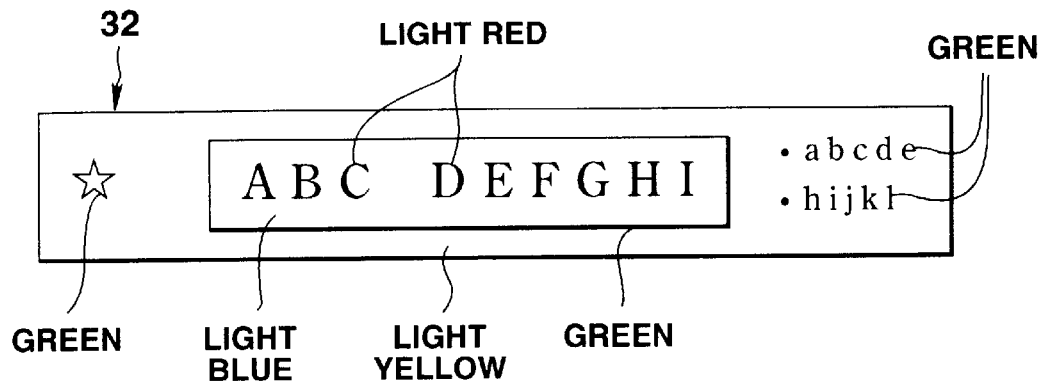
FIGS. 15A, 15B and 15C illustrate labels printed in selected combinations of colors; yellow 1, yellow 2 and red 1, respectively.
Figure 15B:
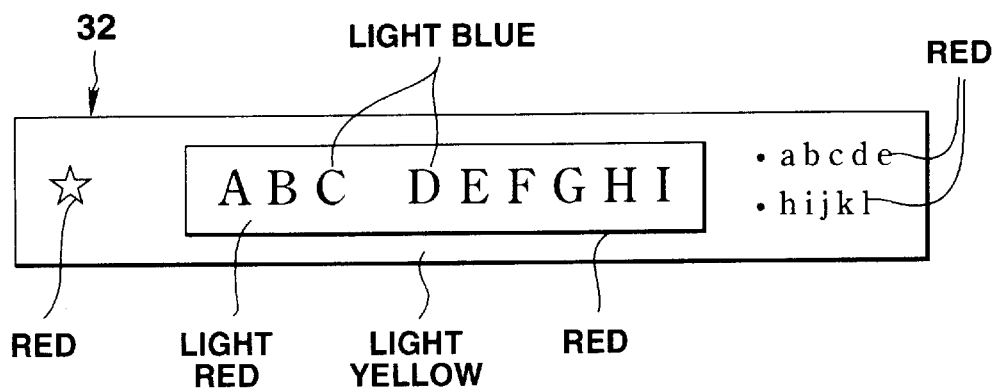
Figure 15C:
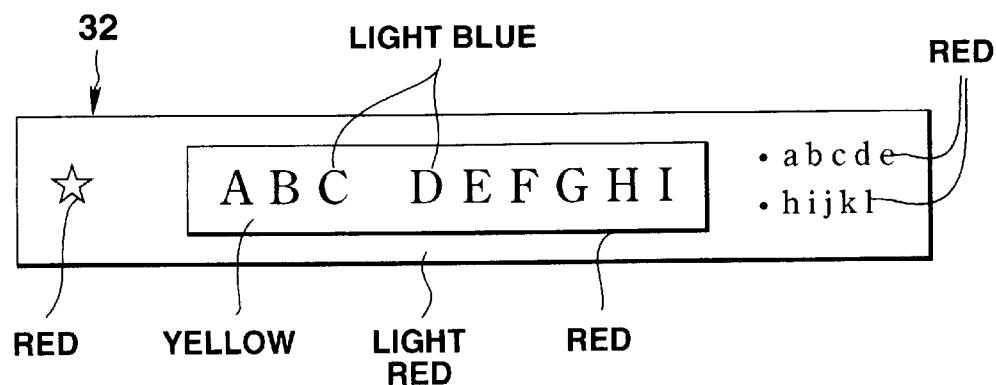
Figure 16A:
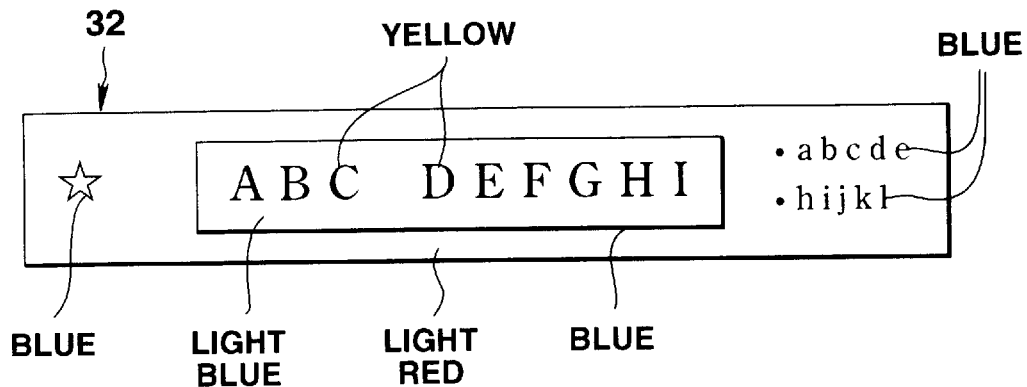
FIGS. 16A, 16B and 16C illustrate labels printed in combinations of colors; red 2, blue 1 and blue 2, respectively.
Figure 16B:
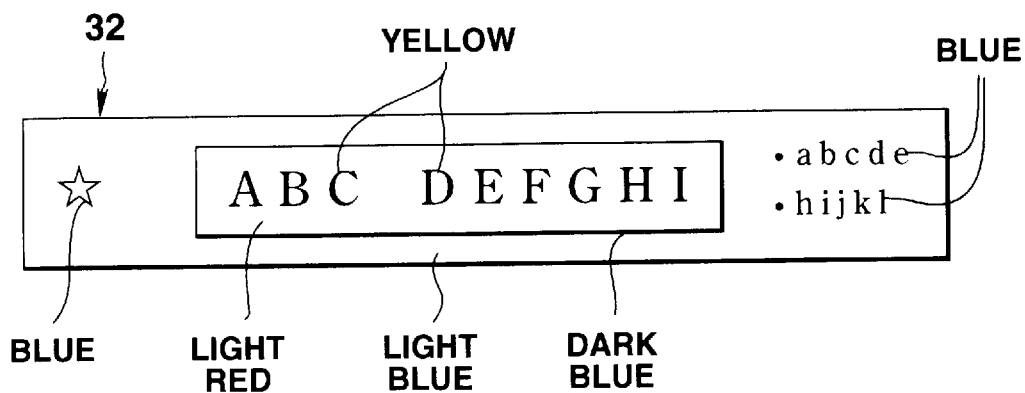
Figure 16C:
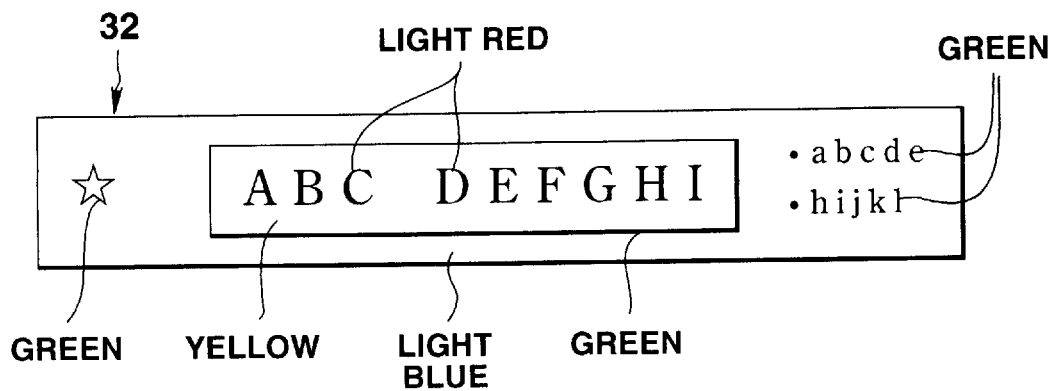

If the controller 20 determines that there is character data, it displays via the display control unit 16 on the display 17 a screen which, as shown in FIG. 14, requests the user to select one of the names of combinations of colors set in Table 4, for example, represented by yellow 1, yellow 2, . . . , blue 2, which should be explained beforehand, for example, in a manual (not shown).

The user operates the cursor keys of the key-in unit 11 to select a desired combination of colors and then presses the enter key to fix the combination.

The controller 20 determines the selected combination of colors at step U5. Assume now that "yellow 1" is selected. The control passes to step U6 where the controller 20 sets "light yellow" as the whole background color in accordance with the contents of Table 4.

The controller 20 then determines whether there is any specified partial background color (step U7). If so, the controller 20 determines the size and position of the partial background in accordance with the length of the character data, stores their data in the partial background data storage area 13*e* (step U8), sets the print color of the partial background at light blue in accordance with the contents of Table 4, and stores its data in the background data storage area 13*e* (step U9). If the controller 20 determines at step U7 that there is no specified partial background color, the flow passes steps U8 and U9.

The controller 20 then determines whether there is any frame specified (step U10). If so, it determines the size and position of a frame in accordance with the length of the character data and stores its data in the frame data storage area 13*g* (step U11) and then the color of the frame is set at green and its data is stored in the frame data storage area 13*g* (step U12). If the controller 20 determines at step U10 that there is no specified frame, the control passes steps U11 and U12.

The controller 20 then sets the character color 1 at green in accordance with Table 4 (step U13). Subsequently, the controller 20 determines whether any character color 2 is specified (step U14). If so, the controller 20 sets the character color 2 at light red in accordance with Table 4 and stores those character color data in the data storage area 13*f* (step U15). If the controller 20 determines at step U14 that no use of a frame is specified, the control passes step U15.

Last, the controller prints the character data in the respective color data set in the process described above (step U16).

FIGS. 15A–15C and FIGS. 16A–16C illustrate examples printed by setting character data and their ornament data as shown in FIG. 12 and selecting the respective color combinations "yellow 1"–"blue 2" at step U5.

By performing such processing, a label having a well harmonized color arrangement is produced without setting colors in a complicated manner. Since any desired one is selected from predetermined combinations of appropriately arranged colors and printed, any failure such as specifying characters and their background of the same print color or similar print colors and hence the inability to read characters on the label are avoided.

In order to specify each of ornaments such as the partial background color, frame, and character color 2, etc., information on each range of ornament and information on a color in which the ornament should be printed are required. Information on specifying a color may be set as information belonging to characters (attribute flag). In this case, however, the number of characters writable into the data storage 13 would decrease and further the time required for the processing would increase, disadvantageously.

In the present printer, a desired combination of colors is specified in printing, so that an appropriate combination of print colors can be set without having any information belonging to the respective characters or the respective texts.

Information on a range of ornaments can be set as information belonging to the characters (attribute flag). In this case, however, the number of characters writable in the data storage 13 would decrease and the processing time would increase. A text whose data are input, edited and for which related data are specified, for the conventional monochromatic printing, is not compatible with that processed so for color printing because they have information different from each other.

In order to solve these problems, data on ornaments for monochromatic and color printing may be put in corresponding relationship as shown in Table 4 below so as to have common information for specifying a range of ornaments. The Table 5 data is stored in ROM 14.

TABLE 5

|  | monochromatic ↔ color |
| --- | --- |
| character ornament | halftone ↔ partial background color frame ↔ frame (colored) standard ↔ character color 1 thick ↔ character color 2 |

The operation of the printer performed when character ornament data are set as shown in Table 5 will be described with reference to the flow charts of FIGS. 13 and 18.

When the print key 11c of the key-in unit 11 is operated, the controller 20 starts a printing process indicated by the flow chart of FIG. 13.

First, the controller 20 determines whether a tape cartridge 31 is set and if so, whether the set cartridge is for color printing or for monochromatic printing (step U1).

If the controller 20 determines that a color printing tape cartridge 31C is set, it determines whether there is any printing character data (step U3). If not, the controller 20 displays a message that there is no printing character data (step U4) and terminates its operation.

If the controller 20 determines that there is printing character data, it displays a screen which requests the user to select one of the names of combinations of colors set in FIG. 14. The user selects one of the names and hence the whole background color.

The controller 20 then determines whether there is any specified partial background color (step U7). If the ornament data input along with character data from the key-in unit 11 and stored in the ornament data storage area 13h is for monochromatic printing of a halftone, frame, standard font, thick characters, etc., the controller 20 determines on the basis of the contents of data stored in the ornament data storage area 13h of the data storage 13 whether the use of a halftone is specified. If the use of a partial background color or halftone is specified, the controller 20 sets data on a partial background (step U8) and sets data on the color of the partial background in accordance with the contents of Table 5 (step U9). If the controller 20 determines at step U7 that neither the use of a partial background color nor a halftone is specified, the control passes steps U8 and U9.

The controller 20 then determines on the basis of the data in the ornament data storage 13h whether the use of a frame is specified (step U10). If so, it sets data on the frame (step U11) and then sets the color of the frame (step U12). If the controller 20 determines that no use of a frame is specified, the control passes steps U11 and U12.

The controller 20 then sets the character color 1 or a standard font at green in accordance with Table 5 (step U13).

Subsequently, the controller 20 determines whether the use of a character color 2 or thick characters is specified (step U14). If the ornament data are for monochromatic printing, the controller 20 determines on the basis of the contents of the ornament data area 13h of the data storage 13 whether the use of thick characters is specified. If the controller 20 determines that the use of the character color 2 or thick characters is specified, the controller 20 then sets the character color 2 in accordance with Table 5 (step U15). If the controller 20 determines at step U14 that neither the use of character color 2 nor the use of thick characters is specified, the control passes step U15.

Last, the controller 20 produces printing data of yellow, magenta and cyan on the basis of the data set in the process described above while performing a sequential color printing process (step U16).

By employing such structure, appropriate color printing is performed, whether the character data and ornament data are input for color printing or for monochromatic printing.

Figure 18:
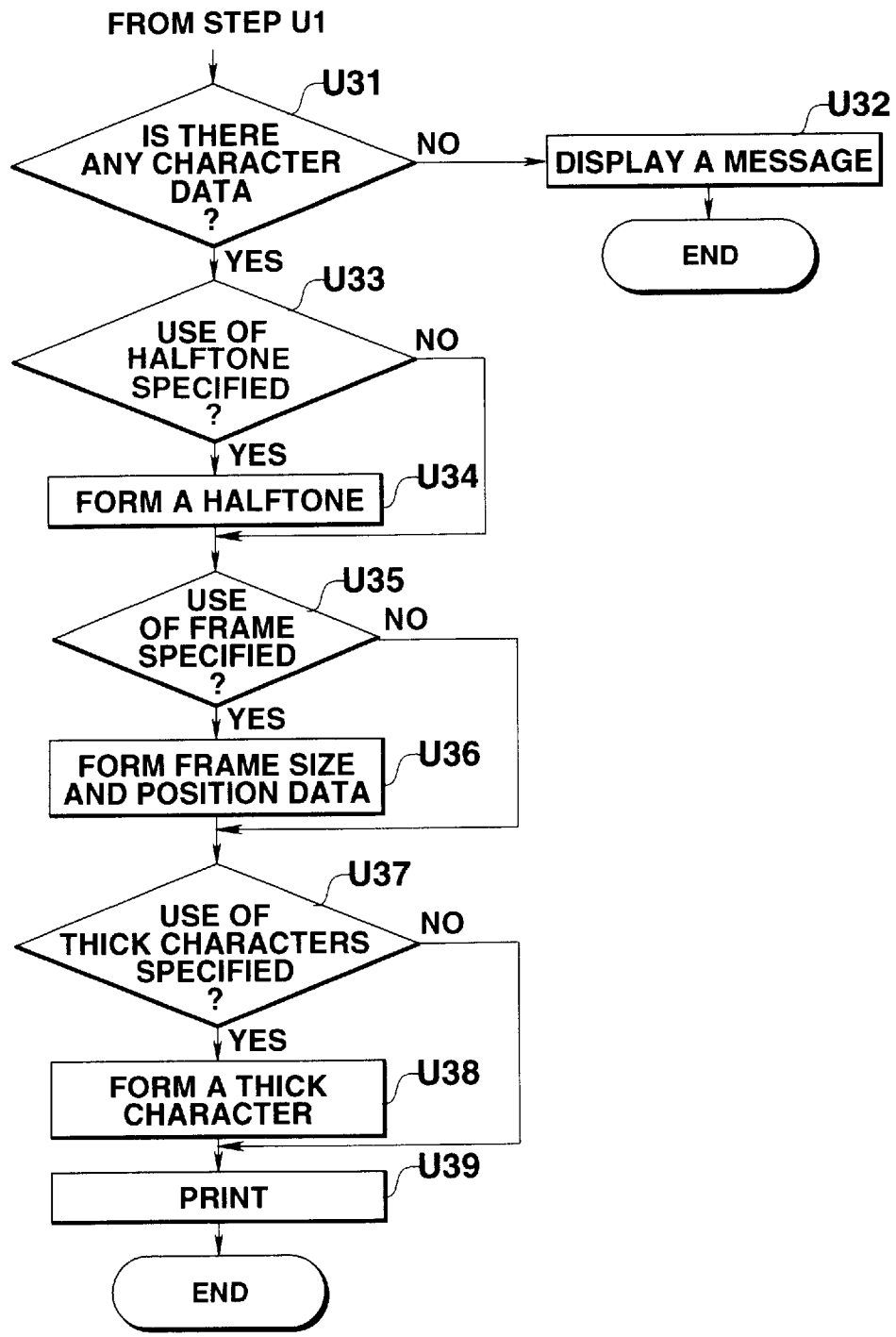
FIG. 18 is a flow chart indicative of monochromatic printing.

When the controller 20 determines at step U1 that the set tape cartridge is for monochromatic printing, the control passes to step U31 of FIG. 18, where the controller 20 determines whether there is any printing character data. If not, the controller 20 displays a message that there is no printing character data (step U32) and terminates its process.

The controller 20 then determines whether the use of a halftone or a partial background color is specified (step U33). If the ornament data is for color printing, the controller 20 determines on the basis of the contents of the partial background data storage area 13e of the data storage 13 whether the use of a partial background color is specified. If the use of a partial background color or the use of halftone is specified, a halftone forming process is performed to produce printing data (step U34). If the controller 20 determines at step U33 that neither the use of halftone nor the use of a partial background color is specified, the control passes step U34.

The controller 20 then determines whether the use of a frame is specified (step U35). If so, it sets frame data (step U36). If the controller 20 determines at step U35 that the use of a frame is not specified, the control passes step U36.

The controller 20 then determines whether the use of thick characters is specified (step U37). If the ornament data are for color printing, the controller 20 determines on the basis of the contents of the character color data storage area 13f of the data storage 13 whether the use of character color 2 is specified. If the controller 20 determines that the use of thick characters or character color 2 is specified, it sets thick character data (step U38). If the controller 20 determines that neither the use of thick characters nor the use of character color 2 is specified, the control passes step U38.

Last, the controller 20 performs monochromatic printing, using a monochromatic ink tape 33 (step U39).

By employing such structure, appropriate monochromatic printing is performed, whether the character data and ornament data are input for color printing or monochromatic printing.

Figure 17:
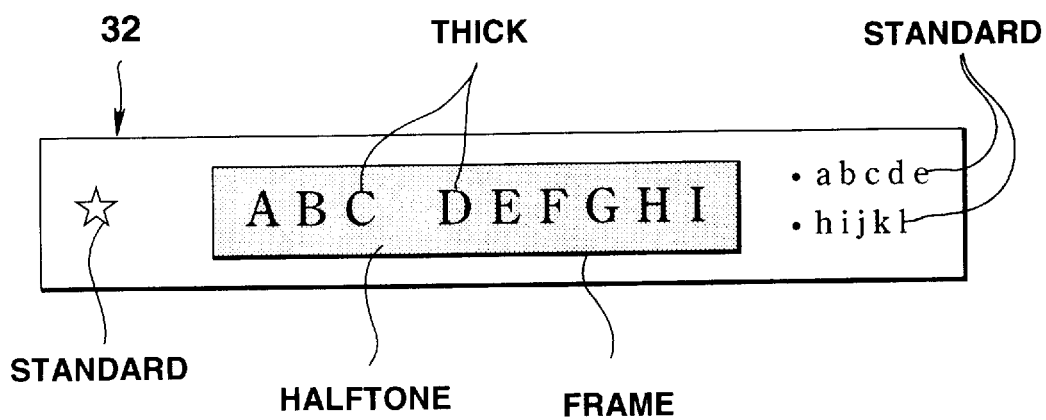
FIG. 17 illustrates a label tape printed in monochrome.

A label on which the color-printing character data of FIG. 12 is printed, using a monochromatic printing tape cartridge, is illustrated in FIG. 17. When the monochromatic printing character data of FIG. 17 is printed, using a color printing tape cartridge, labels having the combinations of colors of FIGS. 15A–16C selected on the color select display screen are obtained.

Similarly, by putting character ornaments not named here in corresponding relationship between color printing and monochromatic printing, compatibility between the color and monochromatic printing is maintained.

While in the third embodiment each of combinations of colors is illustrated as being selected by the name of a color basically representing the whole background color of that combination, as shown in FIG. 14, it may be selected by the name of an image produced by a combination of colors, for example, as shown in Table 6A or 6B below.

TABLE 6A

| Name | whole background color | partial background color | character color 1 | character color 2 | frame color |
|------|------------------------|--------------------------|-------------------|-------------------|-------------|
| spring | green | light pink | pink | yellow | yellow |
| hot summer | red | yellow | black | blue | blue |
| cool in summer | light blue | white | blue | dark blue | dark blue |
| autumn | yellow | brown | red | black | black |
| cold winter | white | light blue | blue | dark blue | blue |

TABLE 6B

| Name | whole background color | partial background color | character color 1 | character color 2 | frame color |
|------|------------------------|--------------------------|-------------------|-------------------|-------------|
| special sale | white | red | black | yellow | red |
| note | yellow | red | black | white | red |

A tape printer has been proposed in which any desired one is selected from among prepared fixed formats, and input characters are inserted into the selected format and printed. In this case, a combination of colors may be set beforehand for each fixed frame.

In the above description, a specified combination of colors is selected by its displayed color name from among the prepared combinations of colors. However, until a label is actually printed, it cannot be known whether the actual hue and color arrangement of the label will satisfy the user's image. In order to confirm the name of a combination of colors and the corresponding actual hue, all the names of combinations of colors of Tables 6A and B may be printed in the respective actual combinations of colors by predetermined key-in operations, as shown in FIG. 19, in which the backgrounds are printed in the corresponding whole background colors and the frames and names are printed in the corresponding character colors 1.

In the first to third embodiments, the inventive tape printers have been illustrated. However, the invention is not limited to them, but is applicable widely to printers and document creating devices in which multi-color and monochromatic printing ink tapes, ink cartridges, etc., are exchangeable as required.

As described above, according to the present invention, even when no print colors are specified in the inputting operation of printing data, a printing medium and printing data thereon can be printed in appropriate colors. In addition, colorful expressive printing is achieved easily.

What is claimed is:

1. A printer comprising:
   an ornamental data storage unit containing first and second color printing ornamental data for specifying different print colors for color printing of characters, and first and second monochromatic printing ornamental data for specifying different fonts for monochromatic of printing characters;
   an input unit for inputting character string data;
   a setting unit for specifying ranges of characters in the character string data, and for inputting and setting one of the second color printing ornamental data and the second monochromatic printing ornamental data with respect to the specified ranges;
   a color combination storage unit containing a plurality of different color combination data each determining a combination of a print color specified by the first color printing ornamental data and a print color specified by the second color printing ornamental data;
   a selecting unit for selecting one color combination data from among the plurality of color combination data contained in said color combination storage unit;
   an accommodating space for selectively receiving one of a color printing cartridge and a monochromatic printing cartridge, said color printing cartridge containing a first printing medium tape and a color printing ink ribbon, said monochromatic printing cartridge containing a second printing medium and a monochromatic printing ink ribbon, and said color printing cartridge and said monochromatic printing cartridge having different outer shapes;
   a cartridge determining unit for determining which of the color printing cartridge and the monochromatic printing cartridge is accommodated in said accommodating space based on the outer shape thereof;
   a data determining unit for determining whether the data inputted and set by said setting unit is the second color printing ornamental data or the second monochromatic printing ornamental data; and
   a printing unit for: (i) responsive to said cartridge determining unit determining that the accommodated cartridge is the color printing cartridge and said data determining unit determining that the second monochromatic printing ornamental data is set, (a) specifying the corresponding second color printing ornamental data stored in said ornamental data storage unit for a range of characters in the printing character string specified by the second monochromatic printing ornamental data, (b) specifying the first color printing ornamental data for a range of characters in the printing character string which is not specified by the second color printing ornamental data, and (c) printing the printing character string specified by the first and second color printing ornamental data in a print color combination determined by the color combination data selected by said selecting unit, and (ii) responsive to said cartridge determining unit determining that the accommodated cartridge is the monochromatic printing cartridge and said data determining unit determining that the second color printing ornamental data is set, (e) specifying the corresponding second monochromatic printing ornamental data stored in said ornamental data storage unit for a range of characters in the printing character string specified by the second color printing ornamental data, (f) specifying the first monochromatic printing ornamental data for a range of characters in the printing character string not specified by the second monochromatic ornamental data, and (g) printing the printing character string in fonts specified by the first and second monochromatic printing ornamental data.

2. A printer comprising:
a first input unit for inputting a character string;

a second input unit for inputting instruction data with respect to a partial background for ornamenting the character string and a whole background as a further background to the partial background for ornamenting the character string;

a color combination storage unit containing a plurality of different color combination data, each determining a combination of a print color for the character string, a print color of the partial background, and a print color of the whole background;

a selecting unit for selecting one color combination data from the plurality of different color combination data stored in said color combination storage unit;

a color setting unit, responsive to input of the instruction data, for automatically setting the print color of the character string, the print color of the partial background, and the print color of the whole background in accordance with the color combination data selected by said selecting means; and a color printing unit for printing the character string, the partial background, and the whole background on a printing medium in the print colors set by said color setting unit.

\* \* \* \* \*